United States Patent [19]

Watanabe et al.

[11] 4,041,059

[45] Aug. 9, 1977

[54] METHOD OF IMPROVING THE OXIDATION RESISTANCE OF AN OIL OR FAT

[75] Inventors: Haruo Watanabe, Funabashi; Toru Kitagawa, Ichikawa; Masaaki Negishi, Chiba; Kiichi Aonuki, Tokyo; Harunobu Kobayashi, Musashino, all of Japan

[73] Assignee: Showa Sangyo Co. Ltd., Tokyo, Japan

[21] Appl. No.: 589,665

[22] Filed: June 24, 1975

Related U.S. Application Data

[63] Continuation of Ser. No. 426,501, Dec. 20, 1973, abandoned.

[30] Foreign Application Priority Data

Dec. 25, 1972 Japan .................................... 47-855

[51] Int. Cl.$^2$ .............................................. B01D 11/00

[52] U.S. Cl. ......................................... 260/424; 210/21

[58] Field of Search ........................... 210/21; 260/424

[56] References Cited

U.S. PATENT DOCUMENTS

| | | | |
|---|---|---|---|
| 2,269,243 | 1/1942 | Baxter et al. | 260/424 X |
| 2,863,890 | 12/1958 | Gutkin | 260/424 |

*Primary Examiner*—Frank A. Spear, Jr.
*Attorney, Agent, or Firm*—Hans Berman

[57] ABSTRACT

The autoxidation resistance of an animal or vegetal fat or oil containing trace amounts of heavy metals which catalyze the autoxidation can be improved by contacting the fat or oil with solid citric, malic, or tartaric acid at a temperature below the melting point of the acid, and thereafter separating the acid particles from the fat or oil.

11 Claims, No Drawings

METHOD OF IMPROVING THE OXIDATION RESISTANCE OF AN OIL OR FAT

This is a continuation of application Ser. No. 426,501, filed Dec. 20, 1973, now abandoned.

BACKGROUND OF THE INVENTION

This invention relates to oils and fats resistant to autoxidation, and particularly to a method of improving the oxidation resistance of an animal or vegetal fat or oil.

Animal and vegetal fat and oils are triglycerides of carboxylic aliphatic acids. When exposed to atmospheric oxygen, particularly at elevated temperature, they are subject to oxidation (autoxidation) which impairs their taste, and may make them unfit for human consumption. Autoxidation of fats and oils is catalyzed by heavy metals, such as iron, copper, and nickel, even in trace amounts which may be picked up from processing equipment as during hydrogenation or refining. The conventional methods for separating the hydrogenation catalysts from processed fats or oils cannot remove the last traces of catalyst metal which are sufficient to promote autoxidation.

Attempts have been made to render the traces of heavy metals inactive by mixing chelating agents with the fats and oils, but the heavy metal complexes formed thereby are decomposed at the elevated temperatures used normally in frying and like common applications of edible fats and oils, and cannot stabilize frying fat or oil for extended periods and repeated use.

SUMMARY OF THE INVENTION

It has now been found that citric, tartaric, and malic acid, which have been more than one carboxyl group and at least one hydroxyl group in the molecule, are effective scavengers for heavy metals in fats and oils when contacted in the solid state with the material to be purified. When the solid acid particles are thereafter separated from the fat or oil, the heavy metal concentration is reduced sufficiently to improve the oxidation resistance of the fat or oil.

While the acids are effective in scavenging heavy metals from fats, which are normally solids, and are readily contacted with the solid fats, it is difficult to separate the small amount of organic acid particles necessary for performing the method of the invention from a solid fat, and it is generally preferred that the fat or oil be in the liquid state at least while being separated from the solid, organic acid particles. The term "oil", employed hereinbelow, will be understood to include fats which are liquid under the conditions described.

In order to permit separation of the organic acids from the purified oil, it is necessary that the process be performed under conditions which facilitate separation, that is, under conditions in which at least a major portion of the organic acid remains solid. The temperature at which the acid is contacted with the oil or fat must be below the melting point of the acid, and the amount of the latter must be sufficient that at most a minor portion of the acid may be dissolved in the oil during contacting, the major portion remaining undissolved and capable of being separated from the oil by conventional methods of solid-liquid separation.

If the method is performed batchwise, the amount of solid acid added to the oil may be between 0.001% and 0.1% of the weight of the oil, and the mixture of organic acid and oil may be filtered or centrifuged. Good results are achieved, also in continuous operation, by passing the oil to be purified through a bed of acid particles. It is usually more economical to employ a bed containing a particulate inert filler intimately mixed with particles of citric, malic, or tartaric acid. Suitable fillers include diatomaceous earth, sand, and glass fibers, and numerous other materials will readily suggest themselves.

The nature of the bond between the organic acids and the heavy metals is not entirely understood. However, the method is not fully effective unless the acid remains in the solid state and is removed as a solid from the oil.

The method of the invention is preferably applied to fat or oil after the latter has been processed industrially in equipment from which it may pick up heavy metals. Thus, edible oil which is deodorized by steaming in a vacuum in a metal container is preferably stripped of traces of heavy metals after the deodorizing treatment. However, removal of metal traces picked up prior to deodorizing reduces decomposition of the oil during the deodorizing treatment. Hydrogenated oil should be subjected to the treatment according to this invention after conventional and incomplete removal of heavy-metal hydrogenation catalyst and prior to further processing at elevated temperature, particularly in the presence of oxygen. If glass-lined equipment is available for at least some process steps, heavy metal traces should be removed before the oil enters the glass-lined vessels, and further treatment according to the invention may be unnecessary thereafter.

Although the full benefits of this invention are not available unless the organic acid is separated from the oil before the oil reaches the ultimate consumer, a small amount of acid left dissolved in the oil somewhat improves storage life.

DESCRIPTION OF THE PREFERRED EMBODIMENTS

The following Examples are further illustrative of this invention.

EXAMPLE 1

Bleached soybean oil having an iodine value of 132.1 and an acid value of 0.10 was enclosed in a stainless steel vessel and kept at a temperature of 250°C for one hour while steam was blown into the oil and a pressure of 2 mm Hg was maintained in the vessel by means of a vacuum pump so that the oil was deodorized. The contents of the vessel were then permitted to cool, and the vessel was opened when the temperature reached 50° C.

The oil was intimately mixed at that temperature with powdered citric acid added to the oil in an amount of 0.01% by weight. The mixture was filtered hot to remove the citric acid particles. The filtrate will be referred to hereinafter as Product A.

A second batch of the same oil was deodorized in the same manner, but the oil was mixed with 0.01% citric acid powder in the vessel at 180° C. The acid melted and dissolved in the oil. The contents of the vessel were then permitted to cool, and the vessel was opened when the temperature reached 50° C. This product will be referred to as Product B.

A third batch of the bleached soybean oil was deodorized as described above, the vessel was opened at 50° C, and a solution of 0.01% citric acid in a small amount of propylene glycol was mixed with the deodorized oil to form Product C.

One half of each product was kept in an open container at 200° C for one hour. 20 ml Samples of each product, unheated and heat-treated, were placed in test tubes, and clean air was blown at ambient temperature through each test tube at a rate of 125 $cm^3$ per minute, samples of aerated oil being taken from the unheated products after 8 hours and after 16 hours, and from the heat-treated samples after 8 hours. The samples were tested for their peroxide values. Each product also was analyzed for its iron and copper content by ashing at low temperature and atomic absorption analysis of the residue.

The results are shown in Table 1.

TABLE 1

| Product | A | B | C |
|---|---|---|---|
| Fe, ppm | 0.05 | 0.18 | 0.18 |
| Cu, ppm | 0.02 | 0.05 | 0.05 |
| Peroxide value, me/kg | | | |
| after 8 hrs., unheated | 30 | 50 | 40 |
| after 16 hrs., unheated | 70 | 110 | 90 |
| after 8 hrs., heated | 40 | 95 | 90 |

The iron and copper content of Products B and C necessarily is that of the deodorized soybean oil. As is evident from the lower heavy-metal content of Product A, iron and copper were removed from the oil together with the citric acid. The lower heavy-metal content of Product A is reflected in the greater oxidation resistance both at ambient temperature with intensive aeration and at 200° C under conditions simulating those prevailing in high temperature frying and similar service. Products B and C show lower oxidation resistance although they contain citric acid.

EXAMPLE 2

Another batch of the bleached soybean oil used in Example 1 was hydrogenated in the presence of a Raney nickel catalyst in a conventional manner until its iodine value dropped to 110. The catalyst was filtered off, and the filtrate was deodorized by steam treatment as in Example 1. When the oil temperature reached 50° C, the oil was passed by gravity through a horizontal bed of two parts (by weight) citric acid powder and one part diotomaceous earth weighing 10 g per square decimeter. The effluent oil was collected (Product A').

A further batch was hydrogenated in the same manner and deodorized, but mixed with 0.01% citric acid at 180° C so that the citric acid was melted and dissolved in the oil (Product B'). Both product were tested for iron and nickel content and for oxidation resistance approximately as in Example 1. The results are listed in Table 2.

TABLE 2

| Product | A' | B' |
|---|---|---|
| Fe, ppm | 0.05 | 0.015 |
| Ni, ppm | 0.21 | 0.10 |
| Peroxide value, me/kg | | |
| after 16 hrs., unheated | 30 | 50 |
| after 24 hrs., unheated | 85 | 120 |
| after 16 hrs., heated | 50 | 120 |

EXAMPLE 3

An additional batch of the bleached soybean oil referred to in the preceding Examples was hydrogenated in the presence of a commercial copper catalyst until its iodine value was 110. The catalyst was removed in a conventional manner after the temperature dropped to 50° C, and 0.01% citric acid powder was intimately mixed with the hydrogenated oil. The oil was then filtered, and the filtrate was deodorized as in Example 1. The steamed oil was permitted to cool to 50° C, and was again mixed with 0.02% citric acid powder and filtered to remove the citric acid particles and the heavy metals associated therewith (Product A'').

The same procedure was applied to a control batch, but the second addition of citric acid to the deodorized oil was made when the latter had still a temperature of 180° C so that the citric acid dissolved (Product B''). Both products were tested as in Example 2, and the results are shown in Table 3.

TABLE 3

| Product | A'' | B'' |
|---|---|---|
| Fe, ppm | 0.03 | 0.20 |
| Cu, ppm | 0.012 | 0.09 |
| Peroxide value, me/kg | | |
| after 16 hrs., unheated | 25 | 80 |
| after 24 hrs., unheated | 70 | 200 |
| after 16 hrs., heated | 40 | 180 |

Citric acid is less costly at this time than malic acid or tartaric acid and is preferred for this reason although the other two acids are equally effective in equal amounts. They do not offer any advantages over citric acid that could justify their higher cost.

Soybean oil has been chosen in the three Examples to provide a basis for comparison of the several procedures employed. The method, however, is generally applicable to animal and vegetal oils and fats which are triglycerides of aliphatic carboxylic acids. Results closely comparable with those shown for soybean oil in the preceding Examples have been achieved with rapeseed oil, safflower oil, sunflower oil, cottonseed oil, palm oil, palm kernel oil, coconut oil, corn oil, rice oil, olive oil, lard, tallow, fish oil, and the products of hydrogenation of those enumerated fats and oils which contain unsaturated fatty acids.

What is claimed is:

1. A method for improving the oxidation resistance of an animal or vegetal fat or oil containing an amount of a heavy metal sufficient to catalyze autoxidation of said fat or oil, which comprises:

a. subjecting said fat or oil to steam distillation while in contact with a body of said heavy metal for a period sufficient to pick up said amount of said heavy metal;

b. intimately contacting said fat or oil in the liquid state with solid citric, malic, or tartaric acid, 1. the amount of said acid being sufficient to leave at least a major portion thereof undissolved after said contacting,
  2. the temperature of said fat or oil during said contacting being below the melting point of said acid; and c. separating the undissolved acid from said fat or oil.

2. A method of improving the oxidation resistance of an animal or vegetal fat or oil containing an amount of a heavy metal sufficient to catalyze autoxidation of said fat or oil, which comprises:

a. intimately contacting said fat or oil in the liquid state with said citric, malic, or tartaric acid, 1. the amount of said acid being sufficient to leave at least a major portion thereof undissolved after said contacting,
  2. the temperature of said fat or oil during said contacting being below the melting point of said acid,
  3. the amount of water in said fat or oil during said contacting being not substantially greater than the amount of water present in said fat or oil after steaming for one hour at 250° C at an absolute pressure of 2 mm Hg; and b. separating the undissolved acid from said fat or oil.

3. A method as set forth in claim 2, wherein said fat or oil is an edible triglyceride of a carboxylic aliphatic acid.

4. A method as set forth in claim 2, wherein said fat or oil is contacted with said acid by intimately mixing particles of said acid with said fat or oil.

5. A method as set forth in claim 4, wherein the amount of said particles is between 0.001% and 0.1% of the weight of said fat or oil.

6. A method as set forth in claim 2, wherein said fat or oil is contacted with said particles by passing said fat or oil in the liquid state over a stationary bed of particles of said acid.

7. A method as set forth in claim 6, wherein said bed additionally contains a particulate inert filler intimately mixed with said particles.

8. A method as set forth in claim 2, wherein said fat or oil is soybean oil, and said acid is citric acid.

9. A method as set forth in claim 8, wherein said heavy metal is iron, copper, or nickel.

10. A method as set forth in claim 2, wherein said fat or oil, prior to said contacting, is held in contact with a body of said heavy metal for a period sufficient to pick up said amount of said heavy metal.

11. A method as set forth in claim 10, wherein said fat or oil, while being held in contact with said body of heavy metal, is subjected to steam distillation.

* * * * *